United States Patent [19]
Chatfield

[11] Patent Number: 4,602,756
[45] Date of Patent: Jul. 29, 1986

[54] INSTRUMENT FASTENING SYSTEM

[76] Inventor: Alan M. Chatfield, 5159 Chimineas Ave., Tarzana, Calif. 91356

[21] Appl. No.: 674,982

[22] Filed: Nov. 26, 1984

[51] Int. Cl.$^4$ .............................................. E04G 3/00
[52] U.S. Cl. .................................. 248/225.1; 403/80; 410/105
[58] Field of Search ............... 248/225.1, 220.2, 224.3, 248/222.1, 223.2, 224.4, 231.9, 501, 503.1, 500; 211/94; 410/104, 105, 8; 403/80, 107

[56] References Cited

U.S. PATENT DOCUMENTS

| | | | |
|---|---|---|---|
| 2,688,504 | 9/1954 | Parker | 410/105 |
| 3,277,844 | 10/1966 | Hakenson | 248/501 |
| 3,554,585 | 1/1971 | Sorenson | 403/107 X |
| 3,570,415 | 3/1971 | Drinnon et al. | 248/501 |
| 4,213,593 | 7/1980 | Welk | 248/501 |
| 4,230,432 | 10/1980 | Howell | 248/503.1 X |
| 4,256,424 | 3/1981 | Knox et al. | 410/104 X |
| 4,396,175 | 8/1983 | Long et al. | 248/503.1 |
| 4,458,869 | 7/1984 | Mayo | 248/225.1 |
| 4,496,271 | 1/1985 | Spinosa et al. | 248/503.1 X |

Primary Examiner—Ramon S. Britts
Assistant Examiner—Ramon O. Ramirez
Attorney, Agent, or Firm—Blakely Sokoloff

[57] ABSTRACT

The combination of a modular, low-profile rail designed to readily accept spring-loaded, self-locking mounting brackets and components, and mounting brackets designed to accomodate specialized equipment is disclosed. The rail is channel-shaped with inwardly-turned flanges notched at intervals into circular recesses, and defining an inverted T-shaped slot. The mounting brackets are secured to the rail by compressing the two piece bracket thus exposing a stud which is inserted into a circular recess of the rail. The bracket is then slid to a position between two recesses and then released, the spring force locking it into place.

6 Claims, 11 Drawing Figures

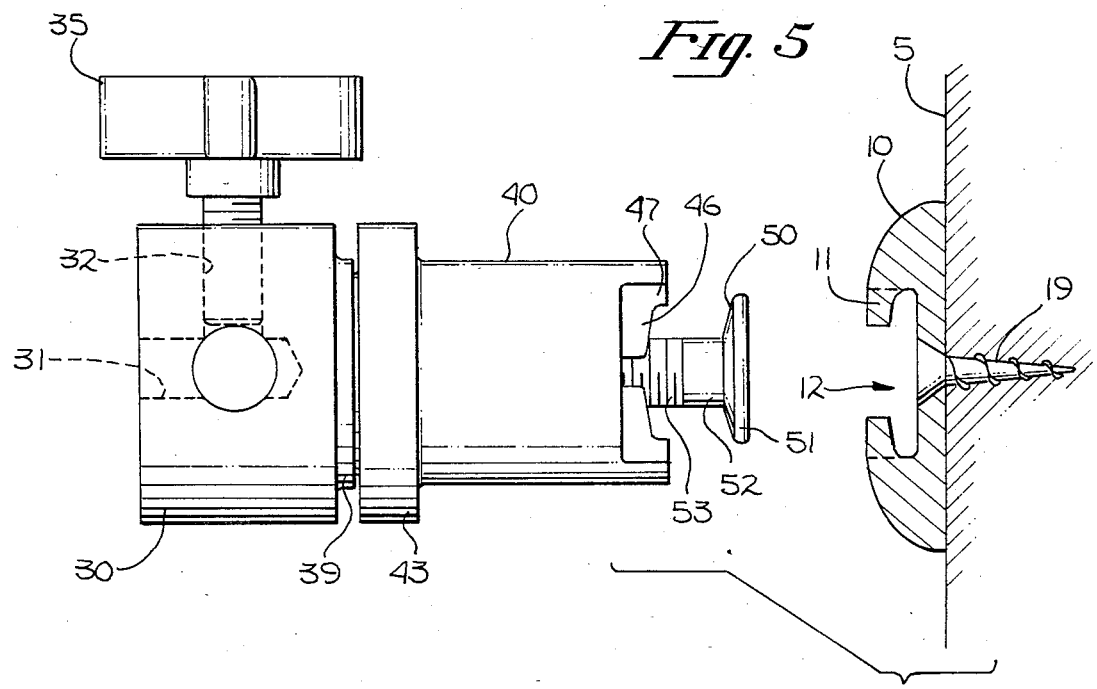
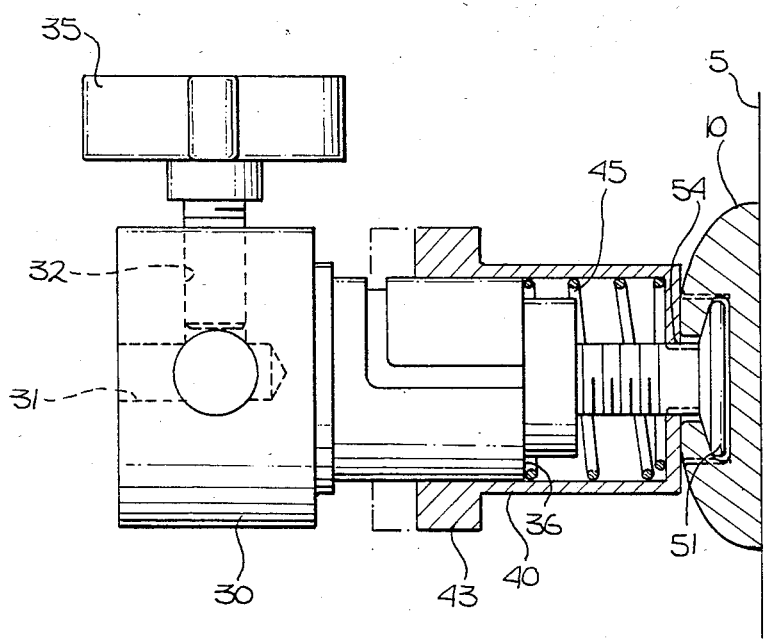

INSTRUMENT FASTENING SYSTEM

BACKGROUND OF THE INVENTION

1. Field of the Invention

The present invention relates to the field of mounting and securing equipment to walls, ceilings, and the like, and has particular reference to means for use in securing specialized medical equipment to walls, ceilings and the like in hospital environments, although its use is not limited thereto.

2. Art Background

In hospital environments, it is highly desirable to have the capability of selectively positioning medical instruments at various locations in a room. Optimally, the relocation of a medical instrument to a new site should be simple to permit adjustments in instrument locations under varied conditions.

Instrument mounting systems currently exist for various applications, but most require that the mounting brackets be tilted during attachment to or removal from the rail. This feature makes these systems difficult to use in medical applications where the mounting systems will be used to support liquids, various equipment, trays.

As will be described, the present invention discloses an instrument fastening system having particular application for use in securing medical equipment in hospital environments. A self-locking mounting bracket is provided which couples a desired medical instrument to a rail having a plurality of T-shaped mounting slots. Medical instruments may be positioned on the rail at any slot location, and repositioned as desired to any other slot.

BRIEF SUMMARY OF THE INVENTION

The primary object of the present invention is to provide a mounting and/or storing system for specialized medical equipment useable in a hospital environment.

The present invention comprises the combination of a modular low-profile rail designed to readily accept spring-loaded, self-locking mounting brackets and components and mounting brackets which are in turn designed to accommodate specialized equipment. The rail is channel-shaped with inwardly turned lateral flanges, which are notched at regular intervals to form circular recesses, overhanging the channel and thus defining a longitudinal inverted T-shaped slot. The bracket is secured to the rail by compressing a spring-loaded outer shell, thus exposing the circular head and shoulder of a stud. The head of the stud is inserted into one of the circular recesses of the rail and slid to a position between the recesses. The bracket is then released and the spring action forces the shell of the bracket to engage the rail and secure the bracket into place. One of the features of the present invention is that the mounting system holds equipment in place, within easy reach, and thereby occupies minimal space in an organized fashion.

Another feature of the present invention is that the mounting brackets which secure the equipment to the rail can be easily inserted or removed from the rail, or repositioned along the rail. In addition, the mounting brackets are designed to be inserted or removed from the rail without tilting, a crucial feature when working with liquids and equipment trays.

The foregoing and other objects, features and advantages of the present invention will be more readily apparent from the following detailed description, which proceeds with reference to the accompanying drawings.

DESCRIPTION OF THE DRAWINGS

FIG. 5 is a side view of the rail and of the utility mounting bracket showing the stud in the extended position.

FIG. 6 is a cross-sectional view of the utility mounting bracket secured to the rail.

DETAILED DESCRIPTION OF THE INVENTION

The present invention comprises the combination of a modular, low-profile rail, designed to readily accept spring-loaded, self-locking mounting brackets and components, and mounting brackets designed to accommodate specialized equipment. In the following description for purposes of explanation, specific dimensions, geometries, shapes and sizes are disclosed in order to thoroughly describe the present invention. However, it will be appreciated by one skilled in the art that these specific details are not required to practice the present invention, but are provided to assure a clear understanding of the invention disclosed.

Figure 1:
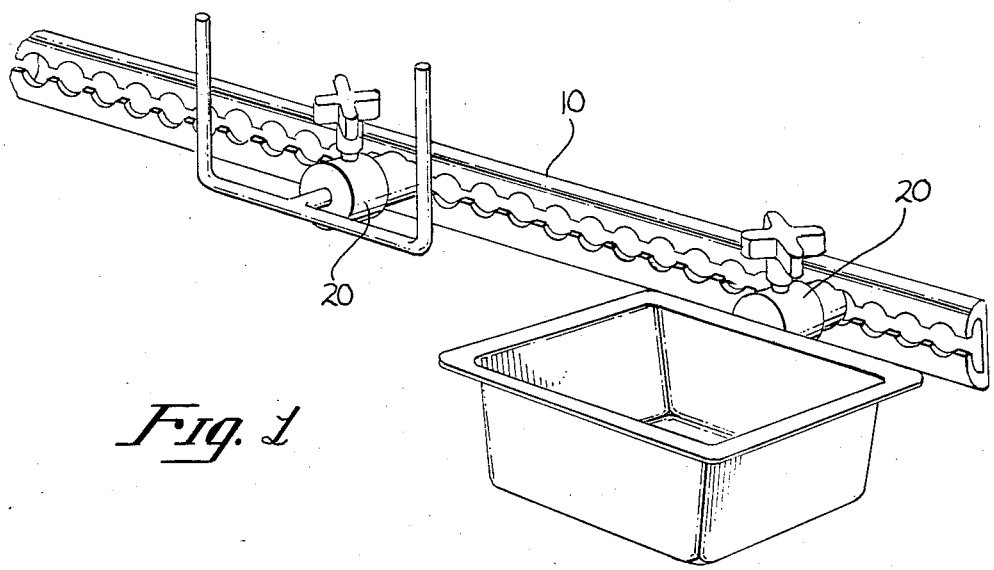
FIG. 1 is a pictorial view of the rail with several mounting brackets supporting medical equipment attached thereto.
Figure 2:
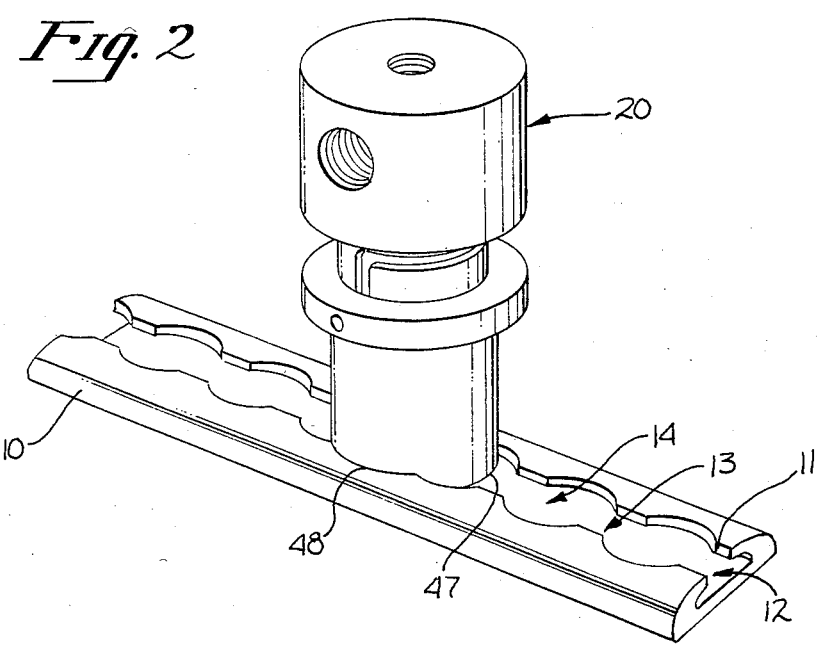
FIG. 2 is a perspective view of the standard gas mounting bracket in place on the rail.

Referring to FIGS. 1, 2, and 5, a rail 10 can be mounted horizontally or vertically on walls, wall consoles, ceilings, crash carts and the like and is secured by screws or other suitable structural fasteners 19 placed at intervals down the length of the rail. The rail 10 is channel-shaped, as shown in FIGS. 1, 2 and 5, and the longitudinal upper edges thereof are provided with inwardly-turned lateral flanges 11 which overhang the channel 12 and which define the narrow, longitudinal slot 13, thus forming an inverted T-shaped slot. The inner edges of the flanges 11 are notched at regular intervals to form circular recesses 14 with a diameter equal to or slightly less than the width of the channel 12.

Figure 3:
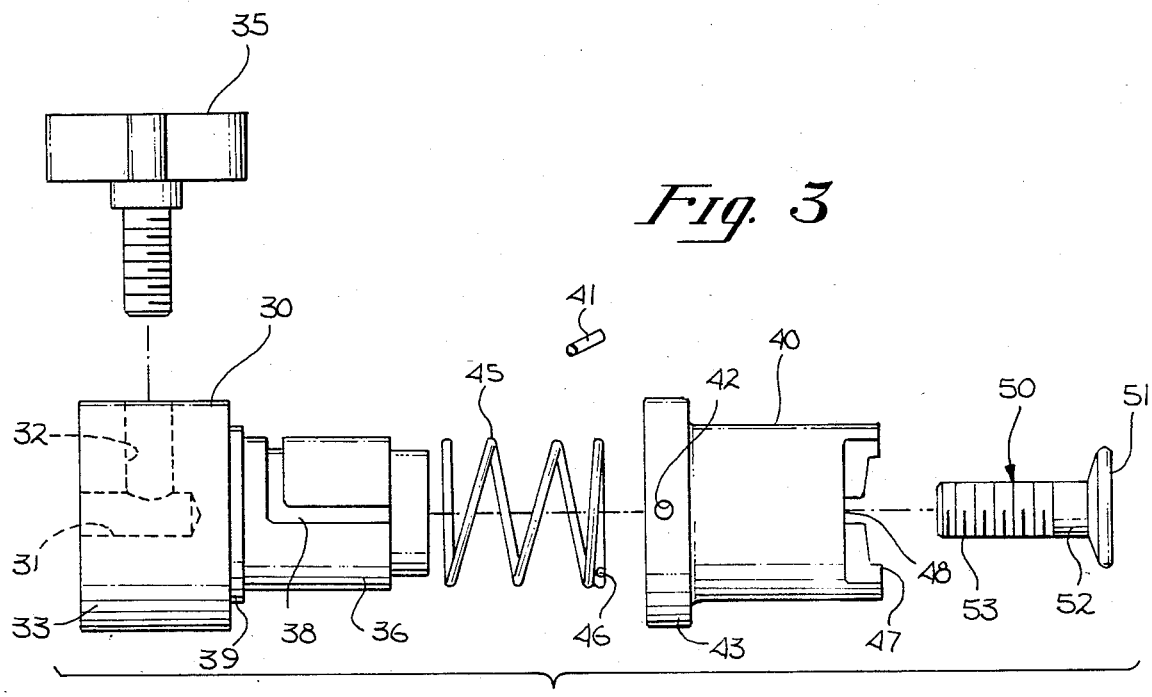
FIG. 3 is an exploded view of the structure of the utility mounting bracket.
Figure 4:
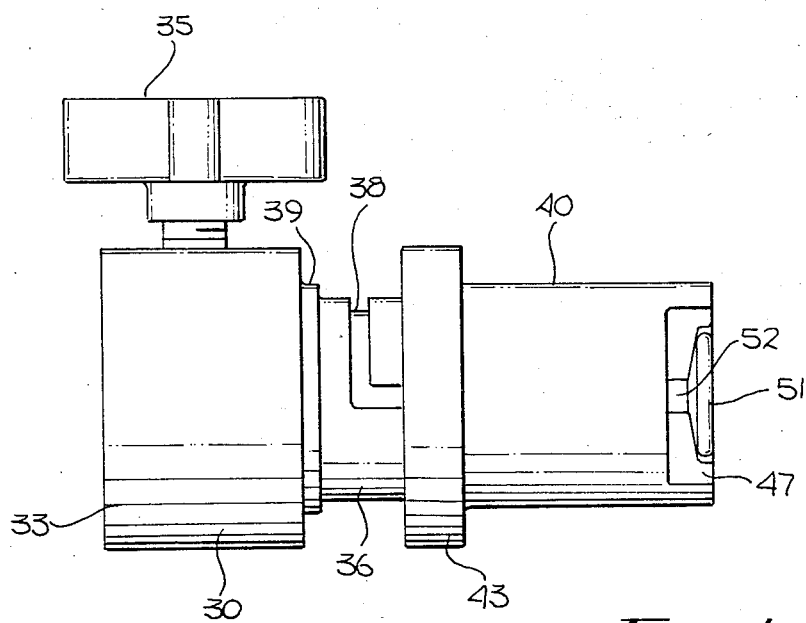
FIG. 4 is a side view of the utility mounting bracket with the stud in the retracted position.
Figure 7:
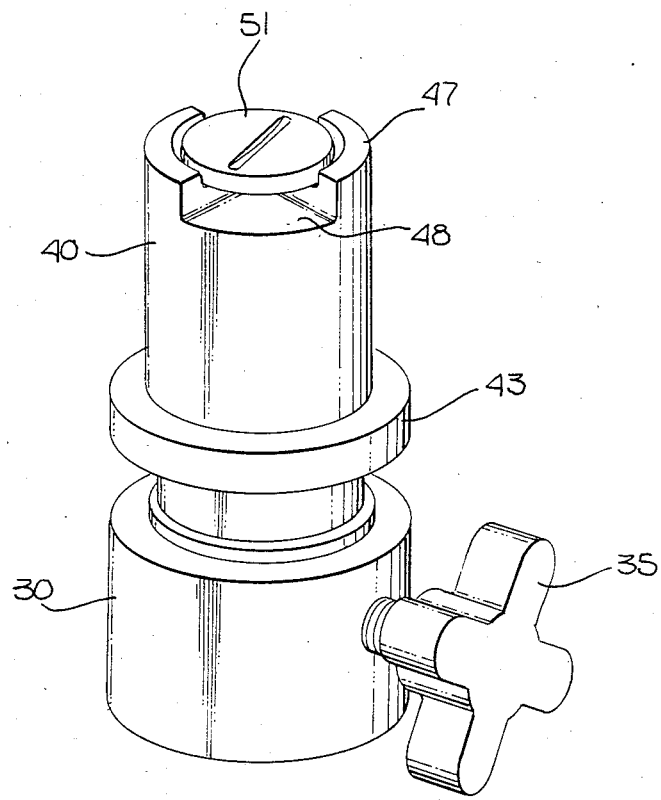
FIG. 7 is a pictorial view of a utility bracket.
Figure 8:
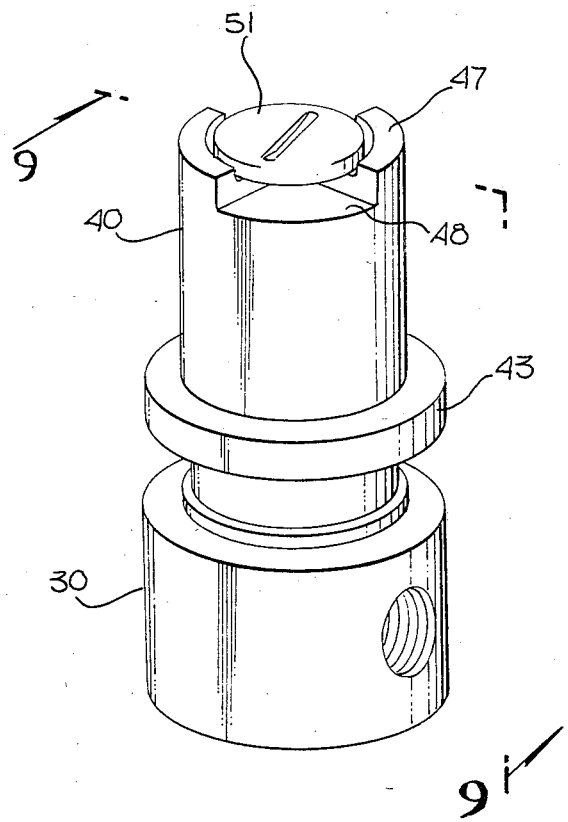
FIG. 8 is a pictorial view of a gas bracket.
Figure 9:
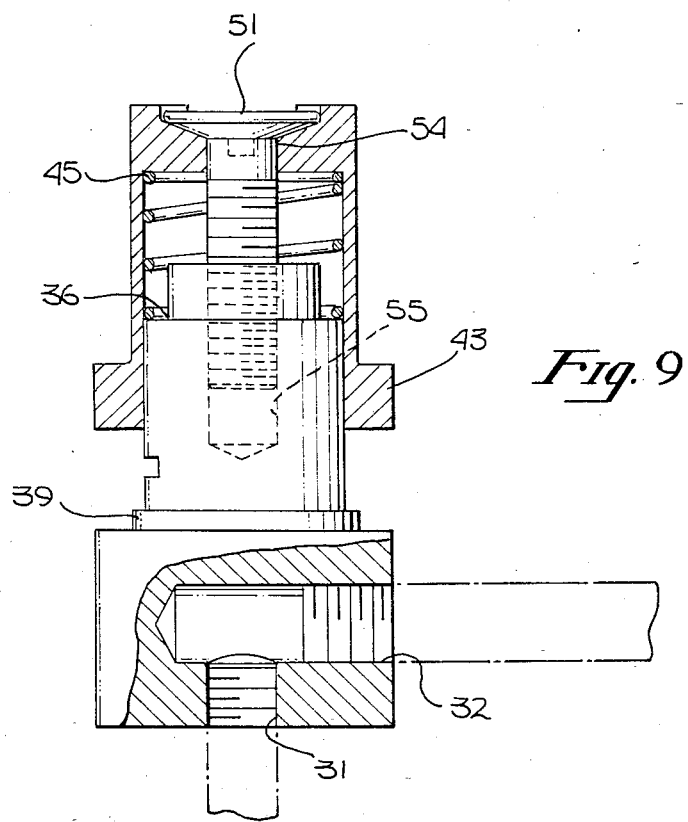
FIG. 9 is a cross-section view of a gas bracket.

As illustrated in FIGS. 3 through 9, a mounting bracket 20 is comprised of two single-machined pieces, a bracket body 30 and a bracket shell 40. A removable stud 50 is also provided which includes a flat circular head 51 having a diameter slightly less than the diameter of the rail recesses 14 for easy insertion therein, and a contour conforming generally to that of the inverted T-shaped slot in rail 10 between the recesses 14, as shown in FIGS. 3, 4 and 5. The circular shoulder 52 and the threads 53 are slightly smaller in diameter than the width of the rail slot 13 so as to be easily passed therebetween. The stud passes through a center hole 54 in the shell 40 and screws into a threaded hole 55 in the bracket body 30 as shown in FIG. 9.

The shell 40 is basically a hollow one-machined piece with an inside bore diameter which allows the shell to slide over the barrel 36 of the bracket body 30 until it contacts ledge 39. The shell 40 has a spring 45 coiled on the inside and attached at end 46 to the inside of the shell. When the shell 40 is slid over the barrel 36, the barrel 36 engages the end of the spring and compresses it. The other end of the shell is covered except for a center bore large enough in diameter to accommodate the threads 53 and shoulder 52 of the stud 50. The flat end has two partial circular flanges 47 each made of two tiers in the form of circular sectors. The circular head 51 of the stud 50 rests against the flange's 47 lower tier and is relatively flush with the outer tier. These flanges are so sized as to engage the rail to when the bracket is secured thereto. The flat end 48 of the shell rests against the upper flange 11 of the rail while the two tier flanges 47 engage the channel, in particular the close edges of the corresponding recesses, as shown in FIG. 2. The other end of the shell has a grasping rim 43 for approximately equal diameter to the base of the body and has a pin hole 42 to accommodate a press-in pin 41. This rim 43 allows easy manipulation of the shell when inserting or removing the bracket from the rail. Pressed-in pin 41 may be inserted into the pin hole 42 so as to engage the groove 38 of the body 30, thereby keeping the body from rotating with respect to the shell 40 and the rail 10. This is particularly important since the body 30 is used to secure any equipment to the rail. The groove 38 allows the pin 41 to remain in place during placement or removal of the bracket from the rail since the pin will slide along the groove as the shell slides over the body.

The bracket body, indicated generally by the numeral 30, is a solid one-machined piece with basically two sections, the barrel 36 and the base 33. The barrel 36 has a diameter allowing it to slide into the shell and engage the spring 45 coiled inside the shell. The base 33 has two threaded holes, one at the end shown as 31 and one on the side shown as 32, which meet in the middle, for attaching equipment to the mounting bracket. In one embodiment of the present invention, the utility bracket as shown in FIGS. 1, 3, 4, 5, 6 and 7, the desired equipment fits into the end hole 31 and is secured there by insertion of knob 35 in the side hole 32. In another embodiment, for example, the gas bracket as shown in Figure 8, various configurations of gas threaded couplings and fittings are installed to provide a flow of medical gases or suction to units or equipment mounted to the bracket.

For operation of the rail and the mounting brackets, the rail is first secured to a wall, ceiling or object by screws 19 or other structural fastening devices. As shown in FIG. 5, to fasten the bracket in place on the rail, the user pulls in on the shell towards the body using the rim 43 for a good grip. The barrel 36 of the bracket body compresses the spring inside the shell. The circular head 51, shoulder 52 and some of the threads 53 of the stud 50 are exposed and the head 51 is inserted into one of the circular recesses in the rail as shown in FIG. 6. The user then slides the bracket along the rail in either direction to position the stud between recesses 14 where desired. The user then releases the shell and if the shell is properly oriented the spring force will force the two tier flanges 47 to engage the recesses to each side, locking the bracket in place. Once in position, the bracket is secure against unintended dislodgment, and since the spring presses the shell against the rail, the bracket does not rattle.

To remove the bracket, the user, using the rim of the shell 43 as leverage, pulls the shell away from the rail, thereby freeing the head so that the user can slide it to a nearby recess from which it can be removed from the rail, or to a new position.

Figure 10A:
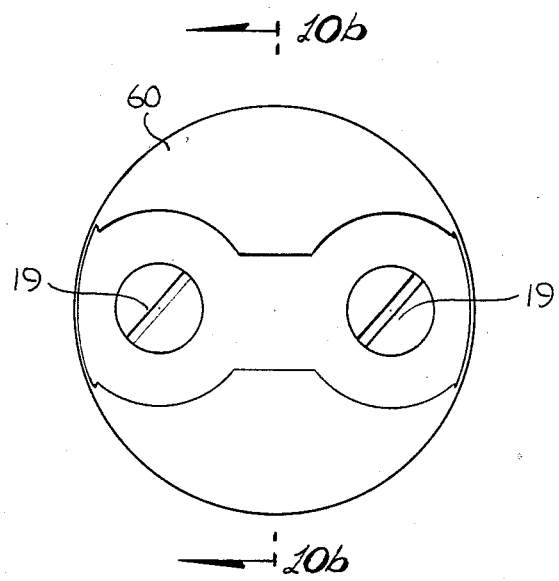
FIG. 10(a) is a top view of a button plate.
Figure 10B:
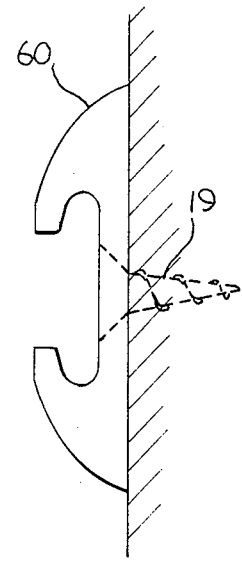
FIG. 10(b) is a side view of a button plate.

FIGS. 10(a) and 10(b) illustrate a button 60, which is a variation on the rail design. Like the rail, the button is secured to the wall, ceiling and the like by screws 19 or other suitable structural fasteners. Except for the fact that the button is circular and can only accommodate one mounting bracket at a single location, the button is identical to the rail and the mounting bracket is secured in the same fashion.

While the invention has been described with particular reference to the preferred embodiment and FIGS. 1 through 10(b), it should be understood that many modifications of structure, material and other characteristics can be made by one skilled in the art without departing from spirit and scope of the invention. The Figures and description are included by way of illustration and not as limitations upon the scope.

I claim:

1. A medical equipment mounting system comprising:
   a rail having a slotted channel, said rail having a plurality of opposing lateral flanges such that said flanges form a restrictive opening along said channel, said rail for mounting a plurality of medical equipment;
   bracket means for coupling said medical equipment to said rail, said bracket means comprising:
   a bracket body for securing said medical equipment;
   a shell having a hollow core for coupling said bracket body to said rail, said shell having lips which are fitted to engage said flanges;
   a stud having a bracket end and a rail end, said bracket end coupled to said bracket body, said stud passing through said hollow core of said shell and said rail end extending past said shell such that said rail end may be inserted into said slotted channel, said rail end of said stud having a flattened head, said flattened head having an increased diameter such that when said rail end is fitted into said slot, said stud may be moved along said slot until said flattened head is positioned behind said flanges, said flanges preventing said flattened head from passing through said restreictive opening, thereby securing said bracket means to said rail;
   spring means for clamping the lips of said shell to said flanges of said rail, said spring means encased within said hollow core of said shell, said shell having means for retaining said spring means within said hollow core, such that said spring means when compressed extends said flattened head located beyond said flanges, and releasing compression on said spring means retracts said stud forcing said flattened head against interior surface of said flanges, thereby further coupling said bracket means to said rail, and preventing rotation of said bracket means;
   whereby medical equipment is secured at a fixed location.

2. The medical equipment mounting system as defined in claim 1, wherein a portion of said bracket body is inserted into one end of said hollow core of said shell, such that said inserted portion of said bracket body rests against said spring means, said spring means being further compressed as said bracket body is further inserted into said shell by a certain compression force, said spring means forcing said bracket body to return to an extended position when said certain compression force is removed.

3. The medical equipment mounting system as defined in claim 2, wherein releasing compression of said spring means further forces said shell to clamp to said flanges, and forcing said lips to engage said flanges.

4. The medical equipment mounting system as defined in claim 3, wherein said bracket body contains a groove, a fixed pin located in said shell terminates in said groove, thereby preventing rotation of said bracket body around said shell.

5. The medical equipment mounting system as defined in claim 4, wherein said bracket body includes a hollow threaded region to accept screw mounted medical equipment.

6. The medical equipment mounting system as defined in claim 4, wherein said bracket body includes at least two openings connected through a hollow region for passing a fluid from one opening to another.

* * * * *